United States Patent
Hsu et al.

(10) Patent No.: US 12,500,558 B2
(45) Date of Patent: Dec. 16, 2025

(54) NO SPUR FAST HOT SWITCHING COUPLER ARCHITECTURE

(71) Applicant: SKYWORKS SOLUTIONS, INC., Irvine, CA (US)

(72) Inventors: Shao-Min Hsu, San Jose, CA (US); Sreedhar Vineel Reddy Kaipu, San Jose, CA (US); Chung-Chieh Lin, Fremont, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 33 days.

(21) Appl. No.: 18/388,208

(22) Filed: Nov. 9, 2023

(65) Prior Publication Data

US 2024/0186963 A1    Jun. 6, 2024

Related U.S. Application Data

(60) Provisional application No. 63/429,274, filed on Dec. 1, 2022.

(51) Int. Cl.
*H03F 3/24* (2006.01)
*H03F 1/56* (2006.01)
*H04B 1/04* (2006.01)

(52) U.S. Cl.
CPC .............. *H03F 3/245* (2013.01); *H03F 1/56* (2013.01); *H04B 1/0458* (2013.01); *H04B 1/0475* (2013.01); *H03F 2200/294* (2013.01); *H03F 2200/451* (2013.01)

(58) Field of Classification Search
CPC ...... H03F 3/245; H03F 1/56; H03F 2200/294; H03F 2200/451; H03F 3/195; H04B 1/0458; H04B 1/0475; H04B 1/40; H04B 1/18; H03K 17/687
USPC .......................................... 375/219, 295–297
See application file for complete search history.

(56) References Cited

U.S. PATENT DOCUMENTS

| | | | |
|---|---|---|---|
| 6,704,352 B1 * | 3/2004 | Johnson ................. | H04B 17/20 |
| | | | 343/822 |
| 8,456,283 B2 * | 6/2013 | Brauner ............... | G06K 7/0008 |
| | | | 370/278 |
| 2013/0201881 A1 * | 8/2013 | Bauder ............ | H04L 25/03878 |
| | | | 370/277 |
| 2015/0326326 A1 * | 11/2015 | Nobbe ...................... | H03F 1/30 |
| | | | 375/224 |
| 2016/0065167 A1 * | 3/2016 | Granger-Jones ....... | H03H 7/465 |
| | | | 333/112 |
| 2017/0195146 A1 * | 7/2017 | Greene ............... | H04L 25/0272 |
| 2017/0352947 A1 * | 12/2017 | Solomko ................ | H01Q 1/248 |
| 2021/0203374 A1 * | 7/2021 | Pal ............................ | H03F 3/72 |
| 2022/0224366 A1 * | 7/2022 | Steigert ................... | H04B 1/44 |

(Continued)

*Primary Examiner* — Emmanuel Bayard
(74) *Attorney, Agent, or Firm* — Lando & Anastasi, LLP

(57) ABSTRACT

In accordance with an aspect of the present disclosure, a radio frequency front end system is provided. The radio frequency front end system comprises an RF path configured to propagate an RF signal between ports of the RF path, an RF coupler configured to extract a portion of a power of the RF signal propagating between the ports of the RF path, and a first RF coupler circuit. The first RF coupler circuit is coupled to the RF coupler and includes a first isolator configured to isolate at least one of a switching transient impedance and a charge spur from the RF path.

20 Claims, 12 Drawing Sheets

(56) References Cited

U.S. PATENT DOCUMENTS

| | | | |
|---|---|---|---|
| 2023/0106620 A1* | 4/2023 | Goldblatt | H04B 1/04 375/297 |
| 2024/0235588 A9* | 7/2024 | Peng | H04B 1/0475 |
| 2024/0267078 A1* | 8/2024 | Lin | H04B 1/44 |

* cited by examiner

007
NO SPUR FAST HOT SWITCHING COUPLER ARCHITECTURE

CROSS-REFERENCE TO RELATED APPLICATIONS

This application claims priority under 35 U.S.C. § 119(e) to U.S. Provisional Patent Application Ser. No. 63/429,274, titled "NO SPUR FAST HOT SWITCHING COUPLER ARCHITECTURE," filed Dec. 1, 2022, the entire contents of which is incorporated herein by reference for all purposes.

BACKGROUND

Field

Embodiments of the present disclosure relate to electronic systems, and in particular, to radio frequency (RF) circuits.

Description of the Related Technology

RF systems can include a plurality of RF couplers and a number of power detectors. Such RF systems can include RF circuitry configured to receive an output of an RF coupler and to provide a coupler signal to a power detector.

An RF coupler can extract a portion of power of an RF signal propagating between ports of an RF path. A power detector in communication with the RF coupler can detect a power level of the RF signal and provide an output indicative of the power level of the RF signal, thereby providing a means for controlling RF systems. Dynamic power adjustment based on a distance from a base station may be mentioned as an example.

With the advance of the 5G standard, fast hot switching between different coupler modes is required to do closed loop power amplifier power control or antenna matching tuning. However, fast transitions of different coupler modes incur serious receiver de-sense issues, which may lead to a high bit error rate (BER) or the like.

Early solutions add a resistor to smooth transient impedance spurs due to coupler switching at the cost of slowed down mode to mode transitions. There have also been attempts to shape a coupler switching waveform, but wave shaping variations due to process variations, temperature variations and supply voltage variations make waveform shaping problematic.

SUMMARY

The systems, methods and devices of this disclosure each have several aspects, no single one of which is solely responsible for the desirable attributes disclosed herein.

To address the above-mentioned problems, embodiments of the present disclosure add an isolation component between the coupler and a coupler circuit (e.g., a coupler multiplexer) so that a switching transient impedance or a charge spur is isolated from the main RF path. Two variants are presented. In a passive solution a traditional isolator is inserted between the coupler and coupler multiplexer switches. In an active solution a unity gain buffer with a dummy resistance of e.g., 50Ω is inserted as coupler termination. The unity gain buffer serves as an active isolator to isolate the transient spur.

In accordance with an aspect of the present disclosure, a radio frequency front end (RFFE) system is provided. The RFFE system comprises an RF path configured to propagate an RF signal between ports of the RF path, an RF coupler configured to extract a portion of a power of the RF signal propagating between the ports of the RF path, and a first RF coupler circuit. The first RF coupler circuit is coupled to the RF coupler and includes a first isolator configured to isolate at least one of a switching transient impedance and a charge spur from the RF path.

According to one example, the first isolator includes at least one of a first passive isolator and a first active isolator. In one embodiment, the first isolator is a first active isolator that includes a first attenuator. In another embodiment, the first active isolator further includes a first low noise amplifier LNA.

In another example, the RF path is coupled to a first RF module and the first RF coupler circuit is coupled to a second RF module. In a further example, the system further comprises a first termination impedance and a first termination switch configured to couple the first termination impedance to a first termination port.

In a further example, the RFFE system further comprises a second RF coupler circuit coupled to the RF coupler and including a second isolator configured to isolate at least one of a switching transient impedance and a charge spur from the RF path. In one embodiment, the second isolator includes at least one of a second passive isolator and a second active isolator. In a further embodiment, the second isolator is a second active isolator that includes a second attenuator and a second low noise amplifier LNA.

In yet a further example, the RF path is coupled to a first RF module and the second RF coupler circuit is coupled to a second RF module. In accordance with this example, the system may further comprise a second termination impedance and a second termination switch configured to couple the second termination impedance to a second termination port.

In accordance with another aspect of the present disclosure, a radio frequency device is provided. The radio frequency device comprises a transceiver and a radio frequency front end (RFFE) system coupled to the transceiver. The RFFE system comprises an RF path configured to propagate an RF signal between ports of the RF path, an RF coupler configured to extract a portion of a power of the RF signal propagating between the ports of the RF path, and a first RF coupler circuit coupled to the RF coupler and including a first isolator configured to isolate at least one of a switching transient impedance and a charge spur from the RF path.

DETAILED DESCRIPTION

Figure 1:
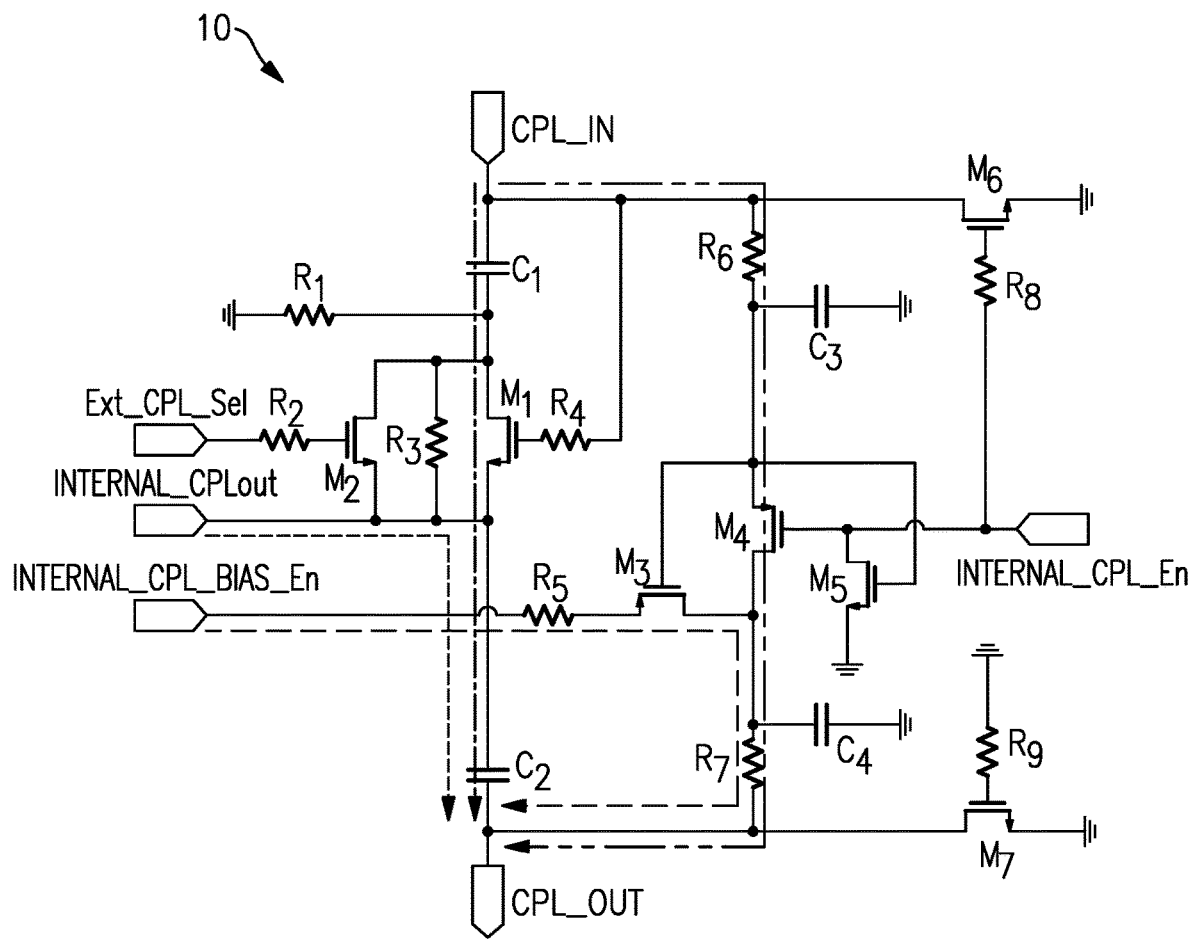
FIG. 1 is a schematic diagram of a coupler circuit according to an example.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The present disclosure addresses the above-mentioned problems and provides active and passive solutions to isolate a switching transient impedance and/or a charge spur from the main RF path. Simulations and feasibility studies in the laboratory show that hot switching between different coupler modes can be achieved without de-sensing. Moreover, as compared to the earlier solutions, the time of mode-to-mode transitions may be significantly reduced.

FIG. 1 is a schematic diagram of a coupler circuit 10 according to an example. The coupler circuit 10 can be implemented in each of a plurality of modules to enable a coupler signal to flow through both active and inactive modules. The coupler circuits in the plurality of modules can be arranged in a daisy chain. The coupler circuit 10 includes direct current (DC) blocking capacitors and RC filters to separate DC and radio frequency (RF) components at an input port CPL_IN and combine DC and RF components at an output port CPL_OUT. Additional circuitry in the DC path of the coupler circuit 10 can allow the DC signal component to flow from the input port CPL_IN to output port CPL_OUT only or to add a DC signal component to the output port CPL_OUT as desired.

As shown in FIG. 1, the coupler circuit 10 includes an input port CPL_IN, an output port CPL_OUT, an internal coupler signal port Internal_CPLout, an internal coupler bias enable port Internal_CPL_Bias_En, an internal coupler enable port Internal_CPL_En, an external coupler select port Ext_CPL_Sel, switches M1 to M7, capacitors C to C4, and resistors R1 to R9. The coupler circuit 10 includes an RF path from the input port CPL_IN to the output port CPL_OUT. The coupler circuit 10 also includes a DC path from the input port CPL_IN to the output port CPL_OUT. The coupler circuit 10 includes an internal RF path from the internal coupler signal port Internal_CPLout to the output port CPL_OUT. The coupler circuit 10 also includes an internal DC path from the internal coupler bias enable port Internal_CPL_Bias_En to the output port CPL_OUT. Any of the switches M1 to M7 can be implemented by any suitable switches. For example, the switches M1 to M7 can be field effect transistors as illustrated. In some other instances, one or more of the switches M1 to M7 can be implemented by another type of transistor or a microelectromechanical systems (MEMS) switch. Regardless of the technology, when a switch is turned on, it can pass a signal.

The input port CPL_IN can receive a coupler signal from an output port CPL_OUT of another coupler circuit. The output port CPL_OUT can provide a coupler signal from the coupler circuit 10 to an input port CPL_IN of a coupler circuit downstream in a daisy chain. The output port CPL_OUT can provide a coupler signal from the coupler circuit 10 to a power detector. The coupler signal at the output port CPL_OUT can have an RF signal component superimposed on a DC signal component.

The coupler signal received at the input power CPL_IN can have a DC component and an RF component. The DC component can activate the coupler circuit 10. Accordingly, the coupler circuit 10 can be referred to as a direct current controlled coupler circuit. In the illustrated coupler circuit 10, the DC component of a coupler signal received at the input port CPL_IN can turn on a switch M1 to pass the RF component of the coupler signal from the input port CPL_IN to the output port CPL_OUT. The RF component of the coupler signal can be an indication of power of an RF signal path. For example, the RF component can be a signal from a coupled out port of a radio frequency coupler. Illustrative examples of RF signal paths and RF couplers configured to provide the RF component of the coupler signal to the coupler circuit 10 are shown in FIGS. 7A to 7F.

Any of coupler circuits herein can receive a signal from any suitable radio frequency coupler including, for example, a directional coupler, a bi-directional coupler, a dual-directional coupler, a multi-band coupler (e.g., a dual-band coupler), etc. As an example, a radio frequency coupler can be a 4 terminal device having a power input port, a power output port, a coupled out port, and an isolated port. The radio frequency coupler can extract a portion of power of an RF signal propagating from the power input port to the power output port. The coupled out port can provide a portion of the power of an RF signal propagating from the power input port to the power output port. A termination impedance can be coupled to the isolated port.

The coupler circuit 10 includes an RF path from the input port CPL_IN to the output port CPL_OUT. The coupler circuit 10 can process an RF signal. Accordingly, the coupler circuit 10 can be referred to as an RF circuit. The RF path includes a first DC blocking capacitor C1, a switch M1, and a second DC blocking capacitor C2. The first DC blocking capacitor C1 can block a DC component of a coupler signal received at the input port CPL_IN. Accordingly, the switch M1 can receive the RF signal component of the coupler signal received at the input port CPL_IN. A biasing element, such as resistor R1, can set a DC voltage at a terminal of the switch M1. When the switch M1 is a field effect transistor, this can set a DC voltage at a drain and/or a source of the switch M1. As illustrated, the switch M1 is an n-type field effect transistor. The switch M1 can turn on based on a signal level of the DC component of the coupler signal received at the input port CPL_IN. For example, when the DC component is asserted (i.e., at a logic 1 level in the illustrated coupler circuit 10), the switch M1 can turn on and pass the RF component of the coupler signal received by way of the first blocking capacitor C1. A resistor R4 can be coupled between the input port CPL_IN and a control terminal of the switch M1, which is a gate of a field effect transistor in FIG. 1.

The second DC blocking capacitor C2 can block a DC component of an internal coupler signal provided to the internal coupler signal port Internal_CPLout of the coupler circuit 10. The internal coupler signal can be provided by a radio frequency coupler of a module that includes the coupler circuit 10. The internal coupler signal can be generated by the same module that includes the coupler circuit 10. By contrast, the coupler signal received at the input port CPL_IN is generated external to the module that includes the coupler circuit.

The coupler circuit 10 includes a DC path from the input port CPL_IN to the output port CPL_OUT. The DC path includes a first RC filter, a switch M4, and second RF filter. In FIG. 1, the first RF filter includes a resistor R6 and a capacitor C3 arranged to filter the RF component of the coupler signal received at the input port CPL_IN. For example, the first RF filter can be a low pass filter configured to block the RF component of the coupler signal and to pass the DC component of the coupler signal. Such a low pass filter can have a corner frequency of, for example, about 30 megahertz (MHZ). The switch M4 can pass the DC component of the coupler signal when the coupler circuit 10 is passing the coupler signal from the input port CPL_IN to the output port CPL_OUT. The switch M4 can be turned off when the coupler circuit 10 is providing a DC component of an internal DC signal from the internal coupler bias enable port Internal_CPL_Bias_En to the output port CPL_OUT. The internal DC signal is provided by a module that includes the coupler circuit 10. The switch M4 can be a p-type field effect transistor as illustrated.

Another switch M5 can turn on the switch M4 and/or maintain the switch M4 in the on state responsive to a DC component of the coupler signal received at the input port CPL_IN being asserted (e.g., corresponding to a logic 1 level). The switch M5 can enable the switch M4 to turn off responsive to a signal at a control terminal of the switch M5 when the DC component of the coupler signal received at the input port CPL_IN is de-asserted (e.g., corresponding to a logic 0 level). In FIG. 1, the second RC filter includes a resistor R7 and a capacitor C4 arranged to filter the RF component of the internal DC signal. The second RC filter can be a low pass filter configured to block RF components. Such a low pass filter can have a corner frequency of about 30 MHZ, for example.

The coupler circuit 10 includes an internal RF path to the output port CPL_OUT. An internal coupler signal can be provided to an internal coupler signal port Internal_CPLout. The internal coupler signal port Internal_CPLout is connected to a node between the switch M1 and the second DC blocking capacitor C2. The internal coupler signal can be an indication of power of a signal in a transmission path, such as an output of a power amplifier or a signal downstream in a transmit path from a power amplifier. The internal coupler signal can be provided by a coupled out port of a radio frequency coupler, in which the radio frequency coupler and the coupler circuit 10 are included on the same module. The second DC blocking capacitor C2 can block a DC component of the internal coupler signal.

The coupler circuit 10 includes an internal DC path from the internal coupler bias enable port Internal_CPL_Bias_En to the output port CPL_OUT. An internal DC signal can be passed by switch M3 to a node between switch M4 and the second RC filter when the internal DC path is activated. The second RC filter can filter out any RF components of the internal DC signal. The switches M3 and M4 can together function as a pass gate in which the switch M3 passes the internal DC signal and the switch M4 passes the DC signal component of a coupler signal received at the input port CPL_IN. As illustrated, the switches M3 and M4 can both be implemented by p-type field effect transistors. An internal coupler enable signal received at an internal coupler enable port Internal_CPL_En can turn off the switch M4 so as to enable the internal DC path. When the DC component of the coupler signal received at input port CPL_IN is at a logic 0 level in the illustrated coupler circuit 10, the switch M3 can be on to pass the internal DC signal and the switches M4 and M5 can be off. Accordingly, the illustrated coupler circuit 10 can pass the internal DC signal to the output port CPL_OUT when the coupler signal received at the input port CPL_IN has a DC level corresponding to a logic 0 level.

The coupler circuit 10 is also compatible with a MIPI based externally controlled mode to pass a coupler signal. Accordingly, the illustrated coupler circuit 10 can operate in a DC biased mode in which a coupler signal is passed in a daisy chain based on a DC component level of a coupler signal or a MIPI based mode. In the MIPI based mode, an external coupler control signal can be provided to a switch M2 to pass an RF component received at the input port CPL_IN. Resistors R2 and R3 can assist in achieving desired functionality in the MIPI based mode. The switch M2 can be turned off and turned on responsive to a signal received at an external coupler select port Ext_CPL_Sel.

The coupler circuit 10 can also provide isolation and/or electrostatic discharge (ESD) protection. A shunt switch M6 can provide isolation and/or ESD protection at the input port CPL_IN. The shunt switch M6 can be on when the internal DC and RF paths are providing the DC and RF components at the output port CPL_OUT. A shunt switch M7 can provide ESD protection at the output port CPL_OUT. The shunt switches M6 and M7 can receive signals at their control terminals by way of resistors R8 and R9, respectively.

Although the coupler circuit 10 may be described with signals having certain logic levels (e.g., logic 0 or logic 1), a coupler circuit can be implemented with one or more signals having a different (e.g., complementary) logic level. This can involve using transistors having different conductivity types, etc.

The coupler circuits discussed herein can be implemented in modules. A module can include circuitry included within a common package. Such a module can be referred to as a packaged module. A packaged module can include a semiconductor die and one or more passive components on a packaging substrate enclosed within a common package. Some such packaged modules can be multi-chip modules. The semiconductor die can be manufactured using any suitable process technology. As one example, the semiconductor die can be a semiconductor-on-insulator die. As another example, the semiconductor die can be a gallium arsenide die.

Figure 2:
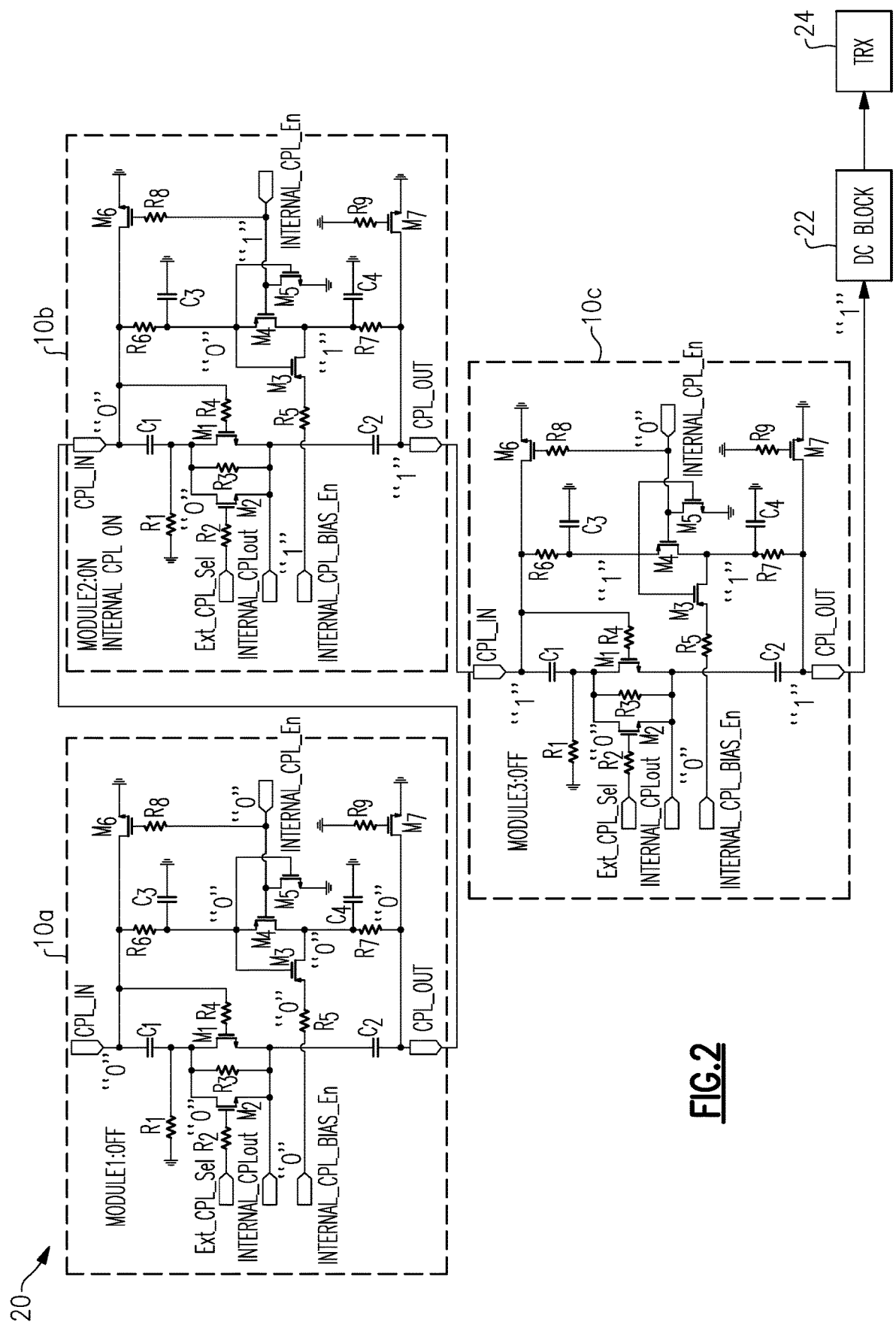
FIG. 2 is a schematic diagram of coupler circuits arranged in a daisy chain according to an example.

FIG. 2 is a schematic diagram of a radio frequency system 20 in which coupler circuits 10a, 10b, and 10c are arranged in a daisy chain according to an example. Each of the coupler circuits 10a, 10b, and 10c can implement the coupler circuit 10 of FIG. 1 in a different module. In particular, the coupler circuit 10a can be implemented in module 1, the coupler circuit 10b can be implemented in module 2, and the coupler circuit 10c can be implemented in module 3. As illustrated, each of the coupler circuits 10a, 10b, and 10c have the same circuit topology. This can provide flexibility in arranging the modules that include these coupler circuits in a daisy chain and/or including one of more of the coupler circuits in a different daisy chain arrangement with one or more coupler circuits from one or more other modules. Coupler circuits of different modules can be electrically connected to each other by way of contacts (e.g., pins, pads, etc.) of the modules. Only one of the coupler circuits 10a, 10b, and 10c can be receiving an internal coupler signal from an RF coupler at a time. A DC blocking element 22 can be coupled between an output of the daisy chain and a transceiver 24. The DC blocking element 22 can be a DC blocking capacitor arranged to block a DC component of the output of the daisy chain. A power detector of the transceiver 24 can receive the output of the daisy chain with the DC component stripped and provide an indication of power of a signal associated with a signal path of an active module. As shown in FIG. 2, modules 1 and 3 are inactive and module 2 is active. Accordingly, the power detector can provide an indication of power of a signal path of module 2 in a state corresponding to FIG. 2.

In FIG. 2, module 1 is inactive and the coupler circuit 10a can be inactive. The coupler circuit 10a of module 1 can provide a coupler signal to the coupler circuit 10b of module 2 that has a DC component corresponding to a signal level indicating that the coupler circuit 10a is not providing an indication of power from an RF coupler of module 1. For example, as illustrated, the coupler signal provided by module 1 to module 2 has a DC component with a logic 0 level.

In FIG. 2, module 2 is active. The coupler circuit 10b of module 2 can receive an internal coupler signal from an RF coupler. The coupler circuit 10b can also receive an internal DC signal. The internal coupler signal and the internal DC signal can be combined at the output port CPL_OUT of the coupler circuit 10b by way of an internal RF path and an internal DC path, respectively, of the coupler circuit 10b. The coupler circuit 10b can provide a coupler signal that has a DC component corresponding to a signal level indicating that the coupler 10b is providing an indication of power from an RF coupler of module 2. The coupler signal provided by the coupler signal 10b can also have an RF component corresponding to the indication of power from the RF coupler of module 2.

The coupler signal provided by the coupler circuit 10b to the coupler circuit 10c can activate the coupler circuit 10c. The coupler circuit 10c can be activated while module 3 is otherwise inactive. The DC component of the coupler signal from the coupler circuit 10b can activate an RF path of the coupler circuit 10c. As shown in FIG. 2, the switch M1 of the RF path of the coupler circuit 10c can be turned on responsive to the DC component of the coupler signal provided by the coupler circuit 10b being at a logic 1 level. As also shown in FIG. 2, the switch M4 of the DC path can be maintained on and/or turned on responsive to the DC component of the coupler signal provided by the coupler circuit 10b being at a logic 1 level. In the coupler circuit 10c, the switch M5 can be turned on responsive to the coupler signal provided by the coupler circuit 10b being at a logic 1 level, which can consequently maintain the switch M4 on and/or turn on the switch M4. With the RF path and the DC path being active, the coupler signal from the coupler circuit 10b can be passed through the coupler circuit 10c. The coupler circuit can propagate from the output port CPL_OUT of the coupler circuit 10C to a power detector of the transceiver 24 by way of the DC blocking element 22.

While FIG. 2 illustrates three coupler circuits 10a, 10b, and 10c that include the same circuit topology, one or more of the coupler circuits in a daisy chain of coupler circuits can include a different circuit topology than one or more other circuits of the daisy chain. For example, a coupler circuit though which all other coupler circuits of the daisy chain are connected to a power detector can be implemented without a DC path in certain instances. In such instances, a DC blocking element can be omitted between an output of the daisy chain and a power detector. As another example, a coupler circuit that does not receive an input from another coupler circuit of the daisy chain can omit circuit elements for processing a coupler signal provided by another coupler circuit.

Figure 3:
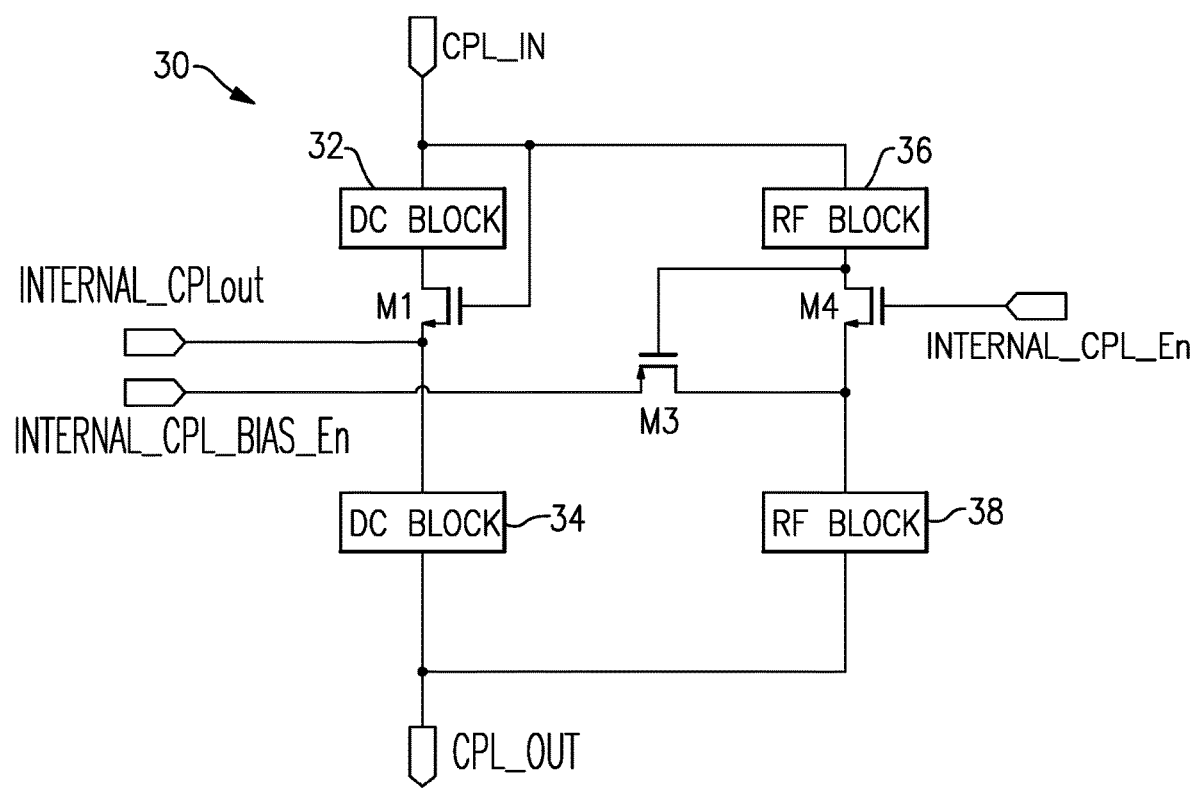
FIG. 3 is a schematic diagram of a coupler circuit according to an example.

FIG. 3 is a schematic diagram of a coupler circuit 30 according to an example. A plurality of coupler circuits 30 can be arranged in a daisy chain in accordance with any of the principles and advantages discussed herein. The coupler circuit 30 includes some features of the coupler circuit 10 of FIG. 1. The coupler circuit 30 can implement similar functionality as the coupler circuit 10.

The coupler circuit 30 includes an RF path from an input port CPL_IN to an output port CPL_OUT and a DC path from the input port CPL_IN to the output port CPL_OUT. The RF path can pass an RF component of a coupler signal received at the input port CPL_IN. The RF path includes a first DC blocking element 32, a switch M1, and a second DC blocking element 34. The DC blocking element 32 can be any suitable circuit element(s), such as a capacitor, to block a DC component of the coupler signal received at the input port CPL_IN. The switch M1 can turn on based on a signal level of the DC component of the coupler signal received at the input port CPL_IN.

The DC path of the coupler circuit 30 can pass the DC component of the coupler signal received at the input port CPL_IN. The DC path includes a first RF blocking element 36, a switch M4, and a second RF blocking element 38. The RF blocking element 36 can be any suitable circuit element (s), such as a low pass filter, to block an RF component of the coupler signal received at the input port CPL_IN. The switch M4 can be on when a module that includes the coupler circuit 30 is inactive. The switch M4 can be on when an internal coupler signal port Internal_CPLout is not providing a coupled out signal from an RF coupler indicative of power in an RF signal path. The switch M4 can be controlled based on a signal received at the internal coupler enable port Internal_CPL_En indicating whether the RF coupler is providing a coupled out signal indicative of RF power.

In the coupler circuit 30, an internal coupler signal can be received at the internal coupler signal port Internal_CPLout and provided to a node between the switch M1 and the DC blocking element 34. An internal DC signal can be received at an internal coupler bias enable port Internal_CPL_Bias_En and provided by way of the switch M3 to a node between the switch M4 and the RF blocking element 38.

Figure 4:
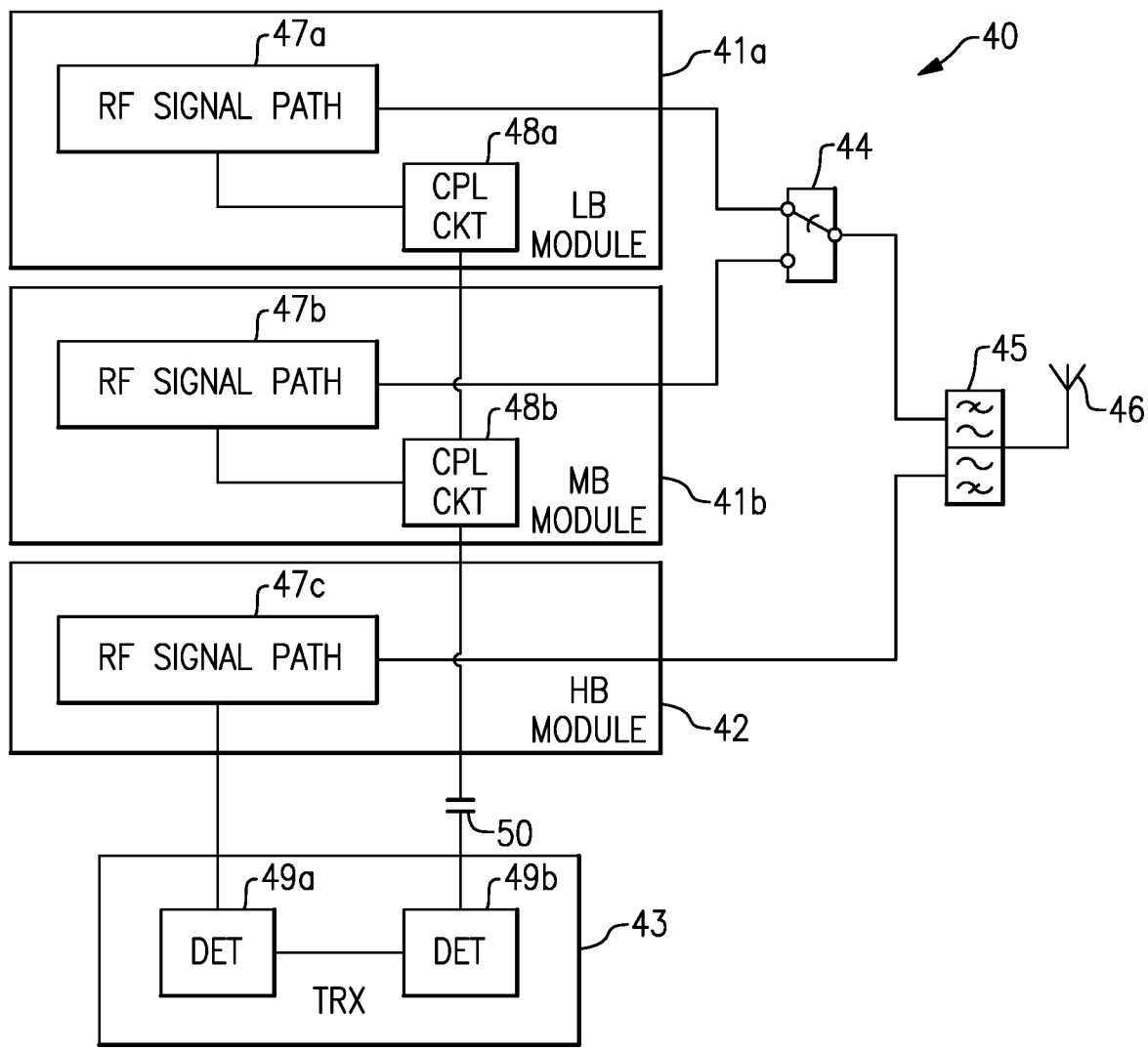
FIG. 4 is a schematic diagram of an RF system with coupler circuits arranged in a daisy chain according to an example.

FIG. 4 is a schematic diagram of a radio frequency system 40 with coupler circuits arranged in a daisy chain according to an example. The RF system 40 can transmit a carrier aggregated signal. Accordingly, the RF system 40 can be referred to as a carrier aggregation system.

As illustrated, the RF system 40 includes a first module 41a, a second module 41b, a third module 42, a transceiver 43, an RF switch 44, a diplexer 45, and an antenna 46. The modules 41a, 41b, and 42 each include an RF signal path 47a, 47b, and 47c, respectively. The modules 41a and 41b each include a coupler circuit 48a and 48b, respectively. The coupler circuits 48a and 48b can be implemented in accordance with any suitable principles and advantages discussed herein. For example, the coupler circuit 48a can be implemented by the coupler circuit 10 of FIG. 1 or the coupler circuit 30 of FIG. 3. The modules 41a, 41b, 42 can each provide an RF signal as an output. The RF switch 44 can selectively electrically couple an output of the first module 41a or an output of the second module 41b to the diplexer 45. The diplexer 45 can frequency multiplex an output signal from the RF switch 44 with the output signal from the third module 42 to generate a carrier aggregated signal. The carrier aggregated signal can be transmitted by the antenna 46.

In the RF system 40, the first module 41a can be a low band module, the second module 41b can be a mid band module, and the third module 42 can be a high band module. A carrier aggregated signal transmitted by the antenna 46 can include either (1) a low band carrier and a high band carrier, or (2) a mid band carrier and a high band carrier. Accordingly, only two of the modules 41a, 41b, and 42 can be active at the same time. In this example, only one of the first module 41a or the second module 41b can be active at time. Since the first module 41a and the second module 41b are not transmitting at the same time, one of these modules can be active and the other module can be inactive.

The coupler circuits 48a and 48b of the first module 41a and the second module 41b, respectively, are arranged in a daisy chain. Only one of the coupler circuits 48a or 48b can receive an internal coupler signal that is indicative of power of a carrier being transmitted by the antenna 46 from a respective RF signal path 47a or 47b. The coupler signal can be provided to a power detector 49b of the transceiver 43 to detect power associated with the carrier. A DC blocking capacitor 50 can be coupled between the daisy chain of coupler circuits and the power detector 49b to block a DC signal component.

As illustrated, the transceiver 43 includes a first power detector 49a and a second power detector 49b. The first power detector 49a can detect a power associated with a carrier of the third module 42. The second power detector 49b can detect a power of a carrier associated with either the first module 41a or the second module 41b depending on which of these modules is active. The transceiver 43 can process outputs of the power detectors and send feedback signals to respective modules 41a, 41b, and 42 to adjust power based on the detected power levels.

Figure 5:
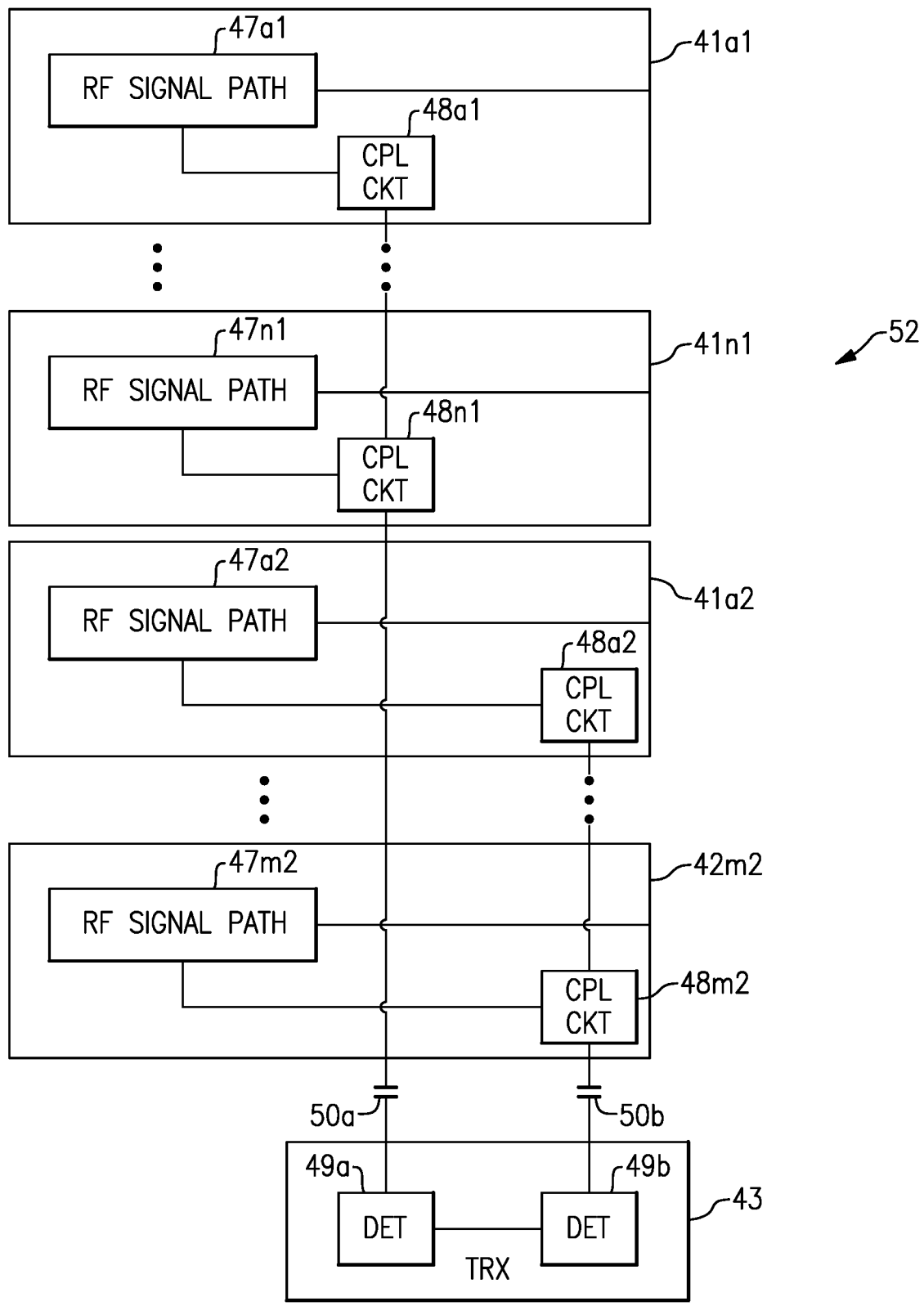
FIG. 5 is a schematic diagram of an RF system with coupler circuits arranged in a daisy chain according to another example.

FIG. 5 is a schematic diagram of a radio frequency system 52 with coupler circuits arranged in a daisy chain according to another example. The radio frequency system 52 includes a first group of modules 41a1 to 41n1 having coupler circuits 48a1 to 48n1, respectively, arranged in a daisy chain and a second group of modules 41a2 to 41m2 having coupler circuits 48a2 to 48m2, arranged in another daisy chain. The coupler circuits of the radio frequency system 52 can be implemented in accordance with any suitable principles and advantages discussed herein. For example, any of the illustrated coupler circuits can be implemented by the coupler circuit 10 of FIG. 1 or the coupler circuit 30 of FIG. 3. Any suitable number of coupler circuits can be arranged in a daisy chain in accordance with any of the principles and advantages discussed herein. Each daisy chain can include coupler circuits in which only one coupler circuit is arranged to receive an internal coupler signal at a time and the remaining coupler circuits are either inactive or arranged to pass the coupler signal from the one coupler signal that is receiving the internal coupler signal. Any suitable number of daisy chained coupler circuits can be implemented in a radio frequency system. In the RF system 52, the transceiver 43 includes power detectors 49a and 49b each arranged to receive an output of a different daisy chain. DC blocking capacitors 50a and 50b can be coupled between outputs of respective daisy chains and respective detectors 49a and 49b.

Figure 6:
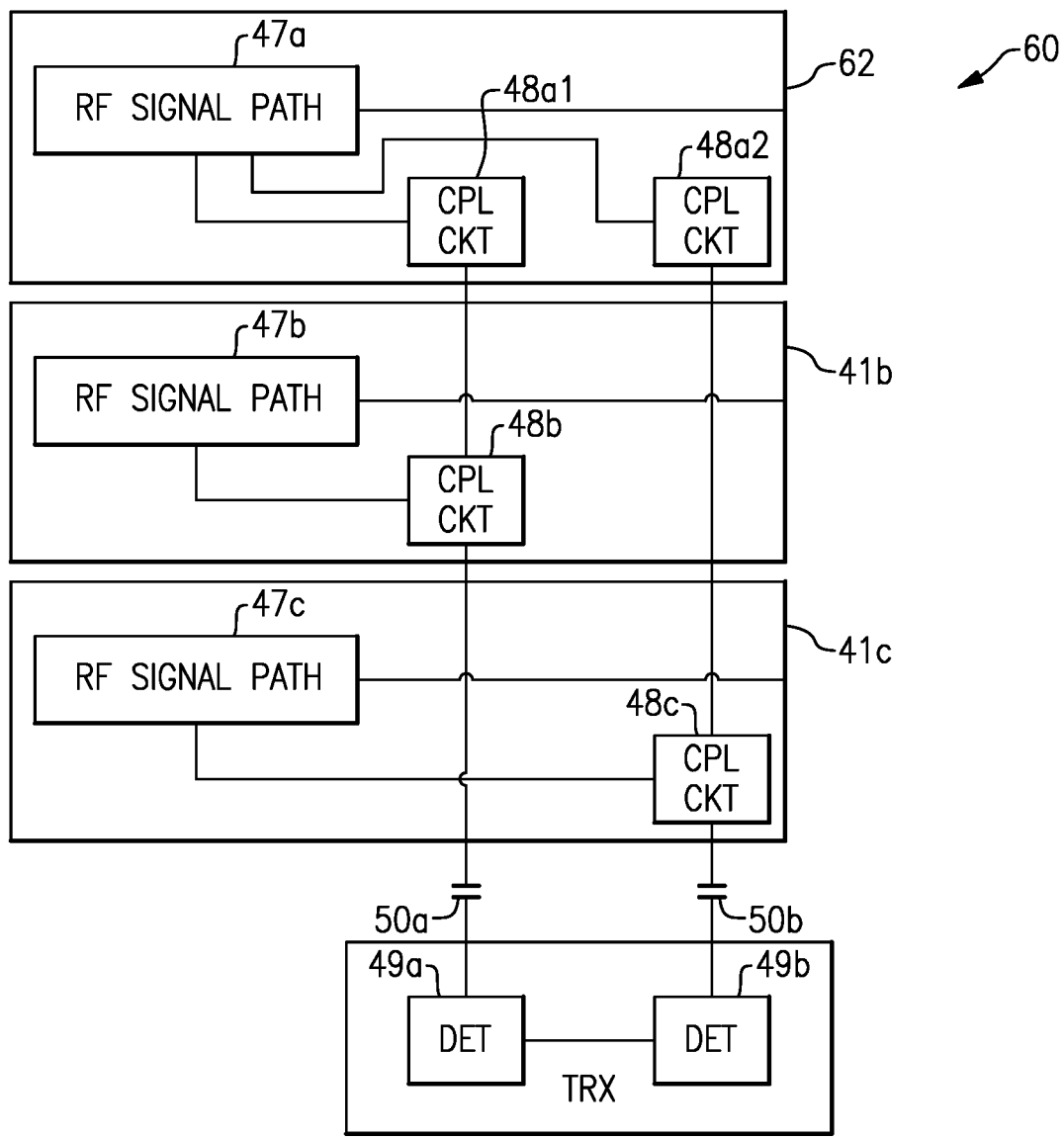
FIG. 6 is a schematic diagram of an RF system with coupler circuits arranged in a daisy chain according to another example.

FIG. 6 is a schematic diagram of a radio frequency system 60 with coupler circuits arranged in a daisy chain according to another example. The RF system 60 illustrates that a module 62 can include multiple coupler circuits 48a1 and 48a2 included in different daisy chains of coupler circuits. The RF signal path 47a of module 62 can include a first portion that is active when the module 41c is active and a second portion that is active when the module 41b is active. The first portion of the RF signal path 47a can include a first RF coupler having a coupled out port configured to provide an internal coupler signal to a first coupler circuit 48a1. The second portion of the RF signal path 47a can include a second RF coupler having a coupled out port configured to provide an internal coupler signal to a second coupler circuit 48a2. Accordingly, each of the daisy chains illustrated in FIG. 6 can have no more than one coupler circuit arranged to receive an internal coupler signal at a time.

FIGS. 7A to 7F are schematic diagrams of radio frequency systems with a coupler circuit according to various examples. Different modules that include coupler circuits arranged in a daisy chain can include RF signal paths that include one or more features of the RF systems of FIGS. 7A to 7F. The RF signal paths of different modules can include different RF signal paths and/or similar RF signal paths. The RF systems of FIGS. 7A to 7F include illustrative examples of RF signal paths that can be implemented in any suitable RF signal path of FIGS. 4 to 6. The RF systems of FIGS. 7A to 7F illustrate example systems in which a coupler circuit 48 can be implemented. The coupler circuit 48 can be implemented in accordance with any suitable principles and advantages of any of the coupler circuits discussed herein, such as the coupler circuit 10 of FIG. 1 and/or the coupler circuit 30 of FIG. 3. Moreover, any suitable combination of features of the illustrative RF systems of FIGS. 7A to 7F can be implemented with each other. In each of the illustrative RF systems of FIGS. 7A to 7F, an indication of power associated with an amplified RF signal provided by a power amplifier in a transit path can be provide to a coupler circuit.

Figure 7A:
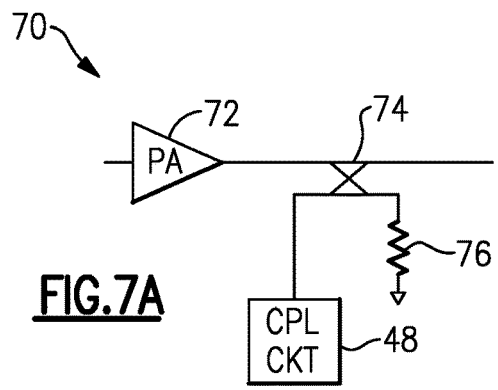
FIG. 7A is a schematic diagram of an RF system with a coupler circuit according to an example.

FIG. 7A is a schematic diagram of an RF system 70 that includes a power amplifier 72 configured to amplify an RF signal and an RF coupler 74 coupled to an output of the power amplifier 72. The illustrated RF coupler 74 can be referred to as a directional coupler. The RF coupler 74 has a termination impedance 76 (e.g., a termination resistor) coupled to a termination port. The RF coupler 74 is arranged to provide an indication of power of an amplified RF signal provided by the power amplifier 72 at a coupled out port. The coupler circuit 48 is arranged to receive the indication of power of the amplified RF signal as an internal coupler signal. The internal coupler signal can be provided to an internal RF path of the coupler circuit 48. For instance, the internal coupler signal can be provided to a port corresponding to the internal coupler signal port Internal_CPLout of the coupler circuit 10 of FIG. 1.

Figure 7B:
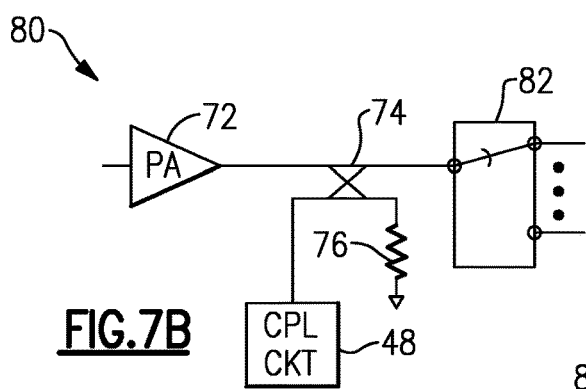
FIG. 7B is a schematic diagram of an RF system with a coupler circuit according to another example.

FIG. 7B is a schematic diagram of an RF system 80 that includes an RF coupler 74 coupled in a signal path between a power amplifier 72 and an RF switch 82. The illustrated RF switch 82 is a multi-throw switch, such as a band select switch. As illustrated, the RF coupler 74 is coupled between an output of the power amplifier 72 and a common port of the RF switch 74.

Figure 7C:
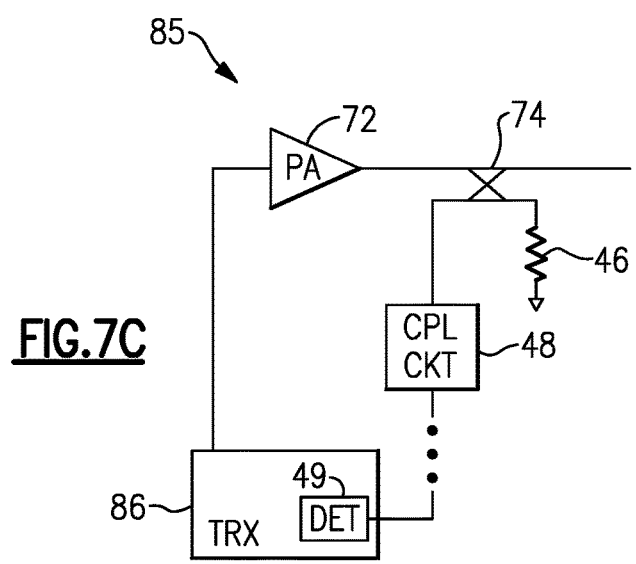
FIG. 7C is a schematic diagram of an RF system with a coupler circuit according to another example.

FIG. 7C is a schematic diagram of an RF system 85 that illustrates a closed loop that can adjust power of an amplified RF signal provided by the power amplifier 72. The closed loop can include coupler circuits arranged in a daisy chain and a power detector 49 arranged to receive an output of the daisy chain. An input to the power amplifier 72 can be adjusted based on a detected power level detected by the power detector 49. A signal provided to the power amplifier 72 by the transceiver 86 can be adjusted based on an output of the power detector 49.

Figure 7D:
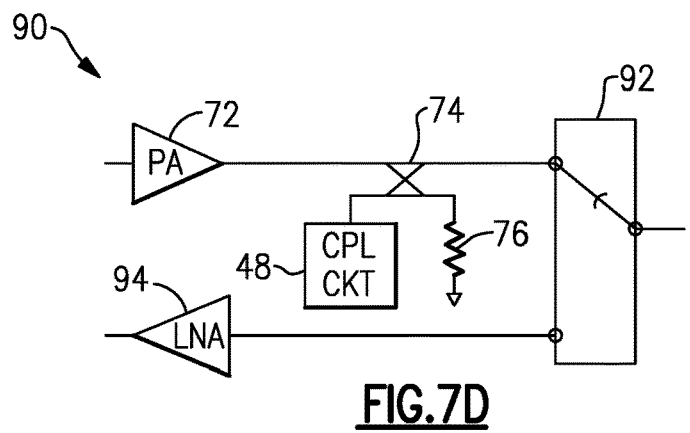
FIG. 7D is a schematic diagram of an RF system with a coupler circuit according to another example.

FIG. 7D is a schematic diagram of an RF system 90 that includes an RF coupler 74 coupled in a signal path between a power amplifier 72 and a transmit/receive switch 92. The transmit/receive switch 92 can selectively electrically couple the power amplifier 72 or a low noise amplifier 94 to a common port of the transmit/receive switch 92.

Figure 7E:
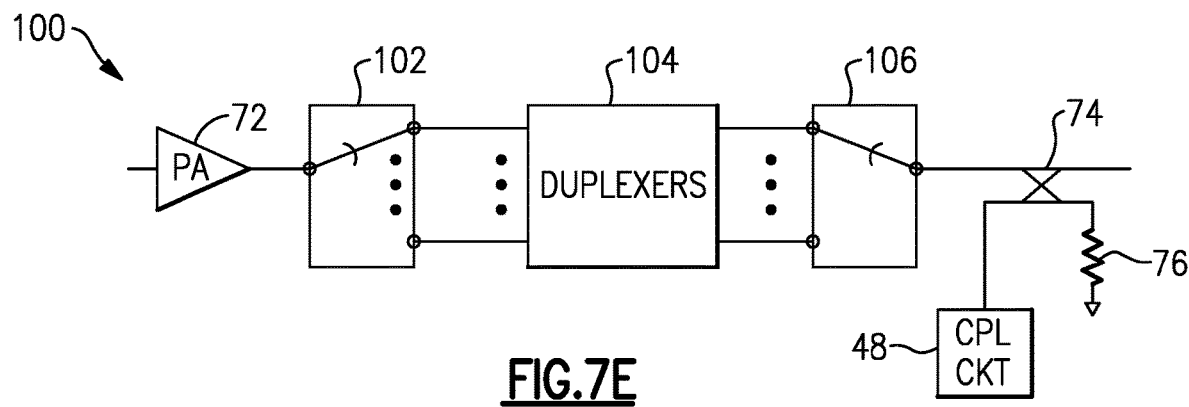
FIG. 7E is a schematic diagram of an RF system with a coupler circuit according to another example.

FIG. 7E is a schematic diagram of an RF system 100 that includes RF switches 102 and 106 and duplexers 104 coupled between a power amplifier 72 and an RF coupler 74. The various paths between an output of the power amplifier 72 and a common port of the RF switch 106 that is connected to the RF coupler 74 can include filtering and/or other processing that is tailored for amplifying particular RF signals.

Figure 7F:
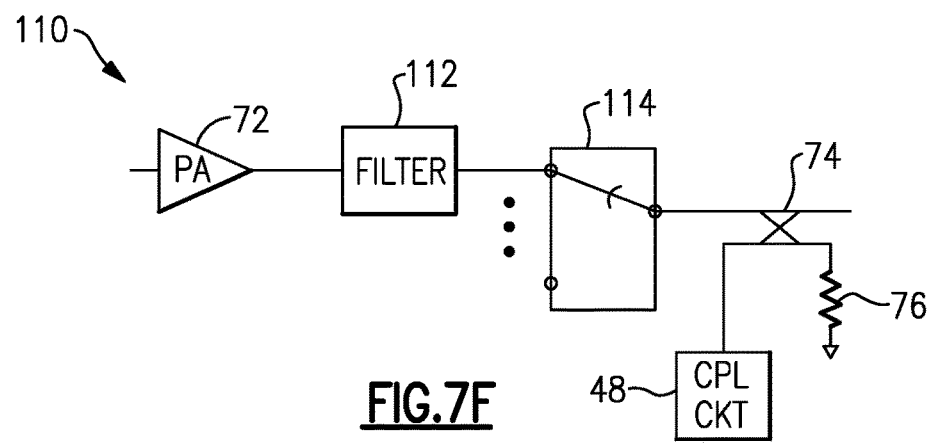
FIG. 7F is a schematic diagram of an RF system with a coupler circuit according to another example.

FIG. 7F is a schematic diagram of an RF system 110 that includes a filter 112 and an RF switch 114 coupled in a signal path between the power amplifier 72 and the RF coupler 74.

Figure 7G:
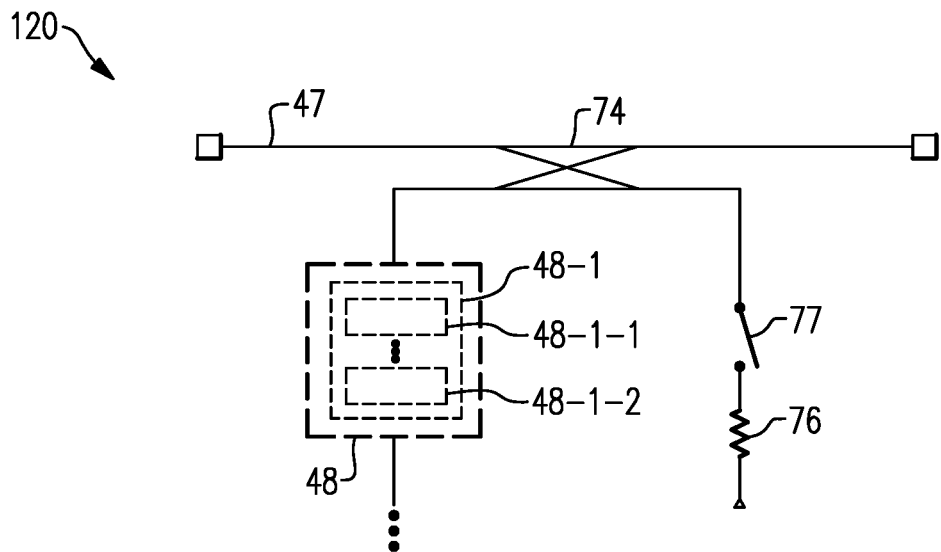
FIG. 7G is a schematic diagram of an RF system with a coupler circuit according to an embodiment of the present disclosure.

FIG. 7G is a schematic diagram of an RF system 120 with a coupler circuit 48 according to an embodiment of the present disclosure. The RF system 120 comprises an RF path 47. The RF path 47 is configured to propagate an RF signal between ports of the RF path 47. The RF path 47 may be coupled between switches and/or a power amplifier and a switch as schematically shown in FIG. 7A to 7F. The RF system 120 shown in FIG. 7G may be combined with any one or more of the examples shown in FIG. 7A to 7F.

The RF system 120 comprises an RF coupler 74. The RF coupler 74 is configured to extract a portion of a power of the RF signal propagating between the ports of the RF path 47. The RF system 120 may comprise a termination impedance 76 (e.g., a termination resistor). The termination impedance 76 may be coupled to a termination port. The termination impedance 76 may be coupled between the RF coupler 74 and the termination port. The RF system 120 may comprise a termination switch 77. The termination switch 77 may be coupled to the termination impedance 76. The termination switch 77 may be coupled between the RF coupler 74 and the termination impedance 76 or between the termination impedance 76 and the termination port.

The coupler circuit 48 may include an isolator 48-1 configured to isolate a switching transient impedance and/or a charge spur from the RF path 47. In FIG. 7G, the isolator 48-1 is positioned between the RF coupler 74 (for example, the coupled port of the RF coupler) and the input port CPL_IN of the coupler circuit 48. The coupler circuit 48 can be implemented by the coupler circuit 10 of FIG. 1 or the coupler circuit 30 of FIG. 3.

The isolator 48-1 may include a passive isolator 48-1-1, an active isolator 48-1-2, or both. Generally either a passive isolator or an active isolator would be used, but where desired to further desensitize any receiver from the effects of the transmitter, both a passive isolator and an active isolator may be used. The passive isolator 48-1-1 may be a surface mounted ferrite circulator 161 as illustrated in FIG. 7J. Alternatively, the isolator may include an active isolator 48-1-2 configured to isolate a switching transient impedance and/or a charge spur from the RF path 47. The active isolator 48-1-2 may comprise a unidirectional buffer 162, as illustrated in FIG. 7K. Alternatively or in addition, the active isolator 48-1-2 may comprise an attenuator 164 and a low noise amplifier (LNA) 166 as shown in FIG. 7K. The LNA 166 may be a 14 dB LNA. The attenuator 164 may be a 13 dB or a 20 dB fixed attenuator, although it should be appreciated that a variable attenuator could alternatively be used.

A switching transient and/or a charge spur may arise from an event after the coupler circuit 48 as indicated by dots in FIG. 7G. FIG. 7I provides a specific example without implying limitations. Although in the example RF system 120 of FIG. 7G the isolator 48-1 is illustrated as being a part of the coupler circuit 48, it should be appreciated that the isolator 48-1 may alternatively be implemented as a separate element outside the coupler circuit 48.

Figure 7H:
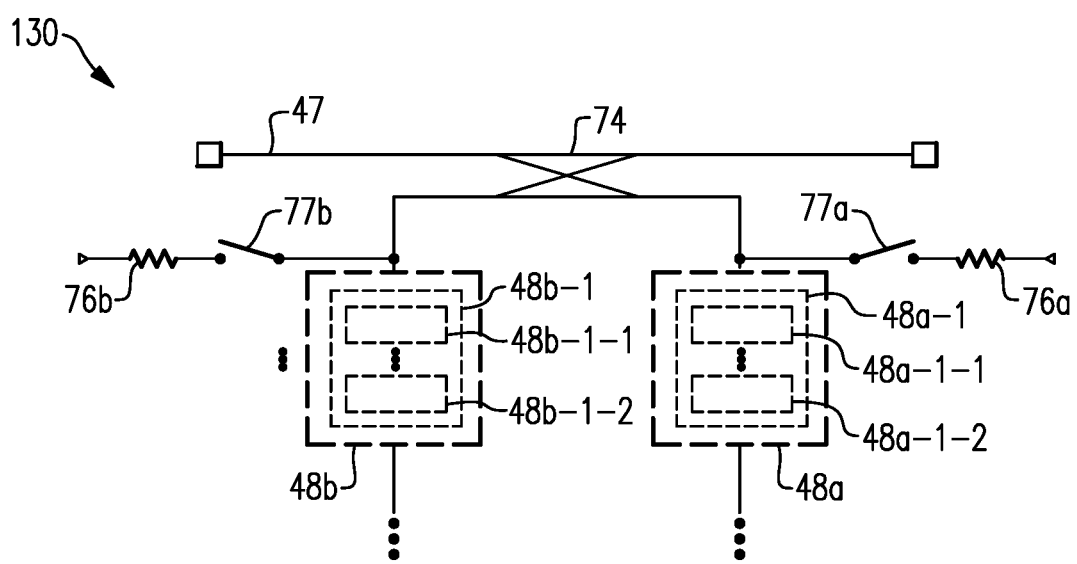
FIG. 7H is a schematic diagram of an RF system with a coupler circuit according to another embodiment of the present disclosure.
Figure 7I:
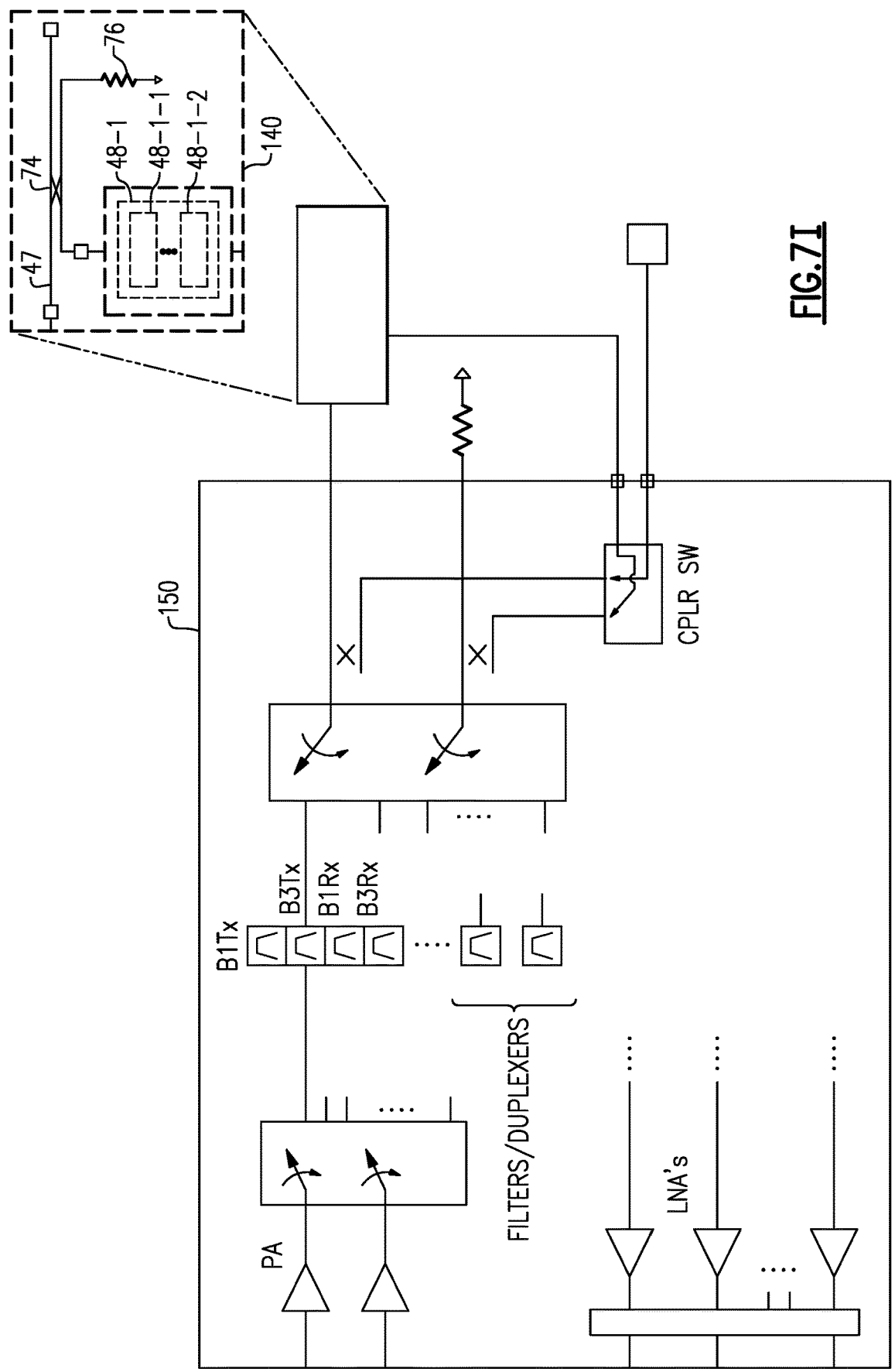
FIG. 7I is a schematic diagram of an RF system with a coupler circuit according to another embodiment of the present disclosure.
Figure 7J:
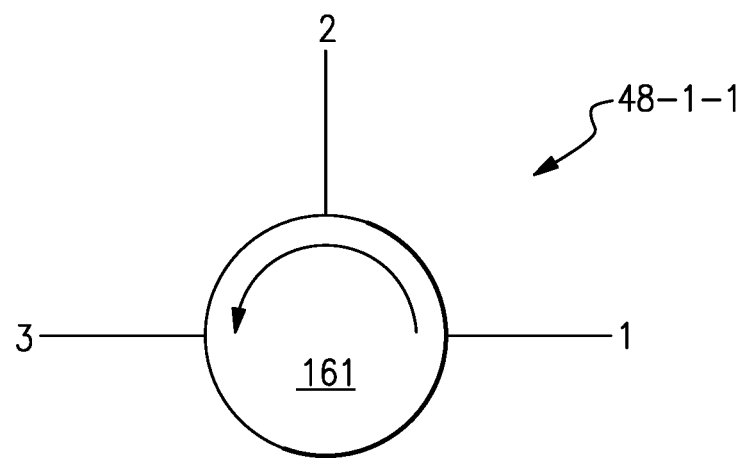
FIG. 7J illustrates a passive isolator, and more particularly a ferrite circulator that may be included in a coupler circuit in accordance with this disclosure.
Figure 7K:
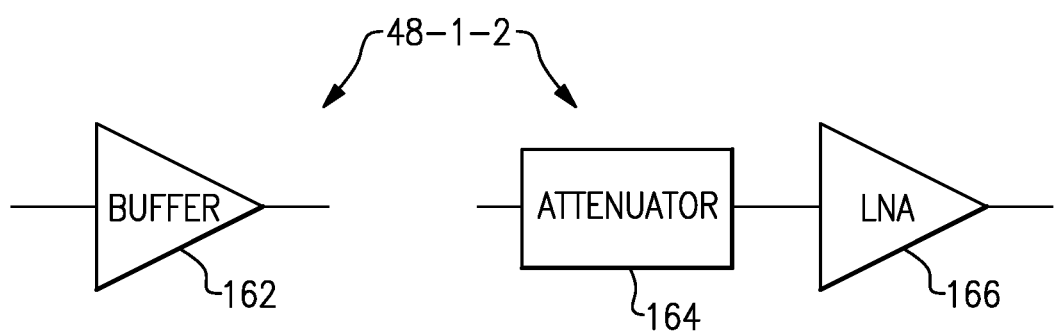
FIG. 7K illustrates an active isolator, such as a unidirectional buffer or an attenuator coupled to a low noise amplifier that may be included in a coupler circuit in accordance with this disclosure.

FIG. 7H is a schematic diagram of an RF system 130 with a first coupler circuit 48a and a second coupler circuit 48b according to an embodiment of the present disclosure. The RF system 130 comprises an RF path 47. The RF path 47 is configured to propagate an RF signal between ports of the RF path 47. The RF path 47 may be coupled between switches and/or a power amplifier and a switch as schematically shown in FIG. 7A to 7F. The RF system 130 shown in FIG. 7G may be combined with any one or more of the examples shown in FIG. 7A to 7F.

The RF system 130 includes an RF coupler 74. The RF coupler 74 is configured to extract a portion of a power of the RF signal propagating between the ports of the RF path 47. The RF system 130 may comprise a first termination impedance 76a (e.g., a termination resistor). The first termination impedance 76a may be coupled to a first termination port. The first termination impedance 76a may be coupled between the RF coupler 74 and the first termination port. The RF system 130 may comprise a first termination switch 77a. The first termination switch 77a may be coupled to the first termination impedance 76a. The first termination switch 77a may be coupled between the RF coupler 74 and the first termination impedance 76a or between the first termination impedance 76a and the first termination port.

The RF system 130 may comprise a second termination impedance 76b (e.g., a termination resistor). The second termination impedance 76b may be coupled to a second termination port. The second termination impedance 76b may be coupled between the RF coupler 74 and the second termination port. The RF system 130 may comprise a second termination switch 77b. The second termination switch 77b may be coupled to the second termination impedance 76b. The second termination switch 77b may be coupled between the RF coupler 74 and the second termination impedance 76b or between the second termination impedance 76b and the second termination port.

The first coupler circuit 48a and/or the second coupler circuit 48b may include isolators 48a-1 and 48b-1 configured to isolate a switching transient impedance and/or a charge spur from the RF path 47. The isolators 48a-1 and 48b-1 may be passive isolators 48a-1-1, 48b-1-1, active isolators 48a-1-2, 48b-1-2, or a combination of active and passive isolators. The passive isolators 48a-1-1 and/or 48b-1-1 may be surface mounted ferrite circulators 161, as shown in FIG. 7J. The active isolators 48a-1-2 and 48b-1-2 may each comprise a unidirectional buffer 162, as shown in FIG. 7K. Alternatively or in addition, the active isolators 48a-1-2 and 48b-1-2 may each comprise an attenuator 164 and a low noise amplifier (LNA) 166, as shown in FIG. 7K. The LNA 166 may be a 14 dB LNA. The attenuator 164 may be a 13 dB or a 20 dB attenuator.

A switching transient and/or a charge spur may arise from one or more events after the coupler circuits 48a and/or 48b as indicated by the respective dots in FIG. 7H. Although in the example RF system 130 of FIG. 7H the isolators 48a-1, 48b-1 are illustrated as being a part of the coupler circuit 48a, 48b, it should be appreciated that the isolators 48a-1 and/or 48b-1 may alternatively be implemented as a separate element outside the coupler circuits 48a, 48b.

FIG. 7I is a schematic diagram of an RF system 140 according to FIG. 7G coupled to a first RF front end (RFFE) module 150 of an RFFE system. The RFFE system may comprise one or more further RFFE modules. The RF system 140 comprises an RF path 47. The RF path 47 is configured to propagate an RF signal between ports of the RF path 47. The RF path 47 may be coupled between switches and or a power amplifier and a switch as schematically shown in FIG. 7A to 7F. The RF system 140 shown in FIG. 7G may be combined with any one or more of the examples shown in FIG. 7A to 7F.

The RF system 140 comprises an RF coupler 74. The RF coupler 74 is configured to extract a portion of a power of the RF signal propagating between the ports of the RF path 47. The RF system 140 may comprise a termination impedance 76 (e.g., a termination resistor). The termination impedance 76 may be coupled to a termination port. The termination impedance 76 may be coupled between the RF coupler 74 and the termination port. The RF system 140 may comprise a termination switch 77 (not shown in FIG. 7I but shown in FIG. 7G). The termination switch 77 may be coupled to the termination impedance 76. The termination switch 77 may be coupled between the RF coupler 74 and the termination impedance 76 or between the termination impedance 76 and the termination port.

The coupler circuit 48 may include an isolator 48-1 configured to isolate a switching transient impedance and/or a charge spur from the RF path 47. The isolator 48-1 may be a passive isolator 48-1-1, or an active isolator 48-1-2. The passive isolator 48-1-1 may be a surface mounted ferrite circulator 161 as illustrated in FIG. 7J. The active isolator 48-1-2 may comprise a unidirectional buffer 162, as illustrated in FIG. 7K. Alternatively or in addition, the active isolator 48-1-2 may comprise an attenuator 164 and a low noise amplifier (LNA) 166 as shown in FIG. 7K. The LNA 166 may be a 14 dB LNA. The attenuator 164 may be a 13 dB or a 20 dB fixed attenuator, although it should be appreciated that a variable attenuator could alternatively be used.

FIG. 7J illustrates a passive isolator, and more particularly a ferrite circulator, that may be included in a coupler circuit in accordance with this disclosure. As shown, energy entering port 1 exist port 2, and energy entering port 2 exits port 3.

FIG. 7K illustrates an active isolator, such as a unidirectional buffer or an attenuator coupled to a low noise amplifier that may be included in a coupler circuit in accordance with this disclosure. The unidirectional buffer 162 has a high impedance input and an output. The attenuator 164 has an input to receive an input signal and an output to provide an attenuated output signal. In some examples, the magnitude of the input signal to the attenuator may be greater than or equal to the magnitude of the output signal, while in other examples, the output magnitude may be the same, or less than the magnitude of the input signal to the attenuator. The output of the attenuator 164 is provided to an input of a Low Noise Amplifier (LNA) 166 that amplifies the received signal. The LNA provides a high impedance input.

TAB. 1 summarizes results for comparison of the performance of the RFFE system 150 of FIG. 7I in different configurations.

TABLE 1

| | | Test Configuration | | | | | |
|---|---|---|---|---|---|---|---|
| | Configuration | ANT TX Power (dBm) | TX Mod. | TX Freq (MHz) | RX Freq (MHz) | TX/RX Seperation (MHz) | CPL On Duration (µS) | Test Period (mS) |
| 1 EVB | No Switching Baseline | 26.3 | CW | 1925 | 1875 | 50 | 30 | 0.5 |
| | 1 Isolator Added | 26.3 | CW | 1925 | 1875 | 50 | 30 | 0.5 |
| | 2 Isolator Cascaded | 26.3 | CW | 1925 | 1875 | 50 | 30 | 0.5 |
| | 2 Isolator Cascaded + 6 dB Attenuator | 26.3 | CW | 1925 | 1875 | 50 | 30 | 0.5 |
| | 2 Isolator Cascaded + 10 dB Attenuator | 26.3 | CW | 1925 | 1875 | 50 | 30 | 0.5 |
| | CPL --> 13 dB Attenuator --> 14 dB LNA | 26.3 | CW | 1925 | 1875 | 50 | 30 | 0.5 |
| | CPL --> 20 dB Attenuator --> 14 dB LNA | 26.3 | CW | 1925 | 1875 | 50 | 30 | 0.5 |
| 2 EVB | Baseline | 26.3 | CW | 1925 | 1875 | 50 | 30 | 0.5 |
| | 1 Isolator Added | 26.3 | CW | 1925 | 1875 | 50 | 30 | 0.5 |
| | 2 Isolator Cascaded | 26.3 | CW | 1925 | 1875 | 50 | 30 | 0.5 |
| | 2 Isolator Cascaded + 6 dB Attenuator | 26.3 | CW | 1925 | 1875 | 50 | 30 | 0.5 |

| | Test Configuration | | | |
|---|---|---|---|---|
| | CPL Signal | CPL Signal | @TX 1925 MHz | @RX 1875 MHz |
| Configuration | Rise Time (µS) | Fall Time (µS) | IL (dB) — Reverse Isolation (dB) | IL (dB) — Reverse Isolation (dB) |

TABLE 1-continued

| | | | | | | | | |
|---|---|---|---|---|---|---|---|---|
| 1 | | No Switching | | | | | | |
| EVB | | Baseline | 0.4 | 0.4 | 0.0 | 0.0 | 0.0 | 0.0 |
| | | 1 Isolator Added | 0.4 | 0.6 | −0.5 | −20.3 | −0.5 | −17.6 |
| | | 2 Isolator Cascaded | 0.4 | 0.5 | −1.0 | −54.5 | −1.0 | −44.8 |
| | | 2 Isolator Cascaded + 6 dB Attenuator | 0.4 | 0.5 | −7.6 | −61.7 | −7.6 | −51.3 |
| | | 2 Isolator Cascaded + 10 dB Attenuator | 0.4 | 0.4 | −11.4 | −65.6 | −11.4 | −55.3 |
| | | CPL --> 13 dB Attenuator --> 14 dB LNA | 0.5 | 0.5 | 0.7 | −33.0 | 0.8 | −33.1 |
| | | CPL --> 20 dB Attenuator --> 14 dB LNA | 0.5 | 0.5 | −6.2 | −40.0 | −6.1 | −40.1 |
| 2 | | Baseline | 0.4 | 0.4 | 0.0 | 0.0 | 0.0 | 0.0 |
| EVB | | 1 Isolator Added | 0.4 | 0.6 | −0.5 | −20.3 | −0.5 | −17.6 |
| | | 2 Isolator Cascaded | 0.4 | 0.5 | −1.0 | −54.5 | −1.0 | −44.8 |
| | | 2 Isolator Cascaded + 6 dB Attenuator | 0.4 | 0.5 | −7.6 | −61.7 | −7.6 | −51.3 |

| | | Gain from ANT to LNA_OUT | LNA OUT @ 1875 MHz (RBW = 8 MHz) | | | LNA IN @ 1875 MHz (RBW = 8 MHz) | |
|---|---|---|---|---|---|---|---|
| | Configuration | @ 1875 MHz LNA Gain (dB) | Rise Peak Spur (dBm) | Fall Peak Spur (dBm) | Noise Floor (dBm) | Rise Peak Spur (dBm) | Fall Peak Spur (dBm) |
| 1 | No Switching | | | | | | |
| EVB | Baseline | 16.0 | −62.1 | −39.2 | −81 ? | −78.1 | −55.2 |
| | 1 Isolator Added | 16.0 | −72.1 | −58.5 | −81 ? | −88.1 | −74.5 |
| | 2 Isolator Cascaded | 16.0 | −71.6 | −71.9 | −81 ? | −87.6 | −87.9 |
| | 2 Isolator Cascaded + 6 dB Attenuator | 16.0 | −77.2 | −67.8 | −81 ? | −93.2 | −83.8 |
| | 2 Isolator Cascaded + 10 dB Attenuator | 16.0 | −79.6 | −68.0 | −81 ? | −95.6 | −84.0 |
| | CPL --> 13 dB Attenuator --> 14 dB LNA | 16.0 | −78.8 | −73.6 | −82.1 | −94.8 | −89.6 |
| | CPL --> 20 dB Attenuator --> 14 dB LNA | 16.0 | −81.3 | −72.5 | −83.3 | −97.3 | −88.5 |
| 2 | Baseline | 16.0 | −66.0 | −44.1 | −81.7 | −82.0 | −60.1 |
| EVB | 1 Isolator Added | 16.0 | −81.6 | −61.5 | −81.8 | −97.6 | −77.4 |
| | 2 Isolator Cascaded | 16.0 | −81.7 | −82.5 | −82.4 | −97.6 | −98.4 |
| | 2 Isolator Cascaded + 6 dB Attenuator | 16.0 | −81.9 | −81.9 | −82.7 | −97.8 | −97.9 |

| | | CPL OUT @ 1875 MHz (RBW = 8 MHz) | | RX Desense (dB) @ 1875 MHz Tx - 1925 MHz (10 MHz 25RB QPSK) | |
|---|---|---|---|---|---|
| | Configuration | Rise Peak Spur (dBm) | Fall Peak Spur (dBm) | Period - 3 ms (ON - 30 μs) | Period - 0.5 ms (ON - 30 μs) |
| 1 | No Switching | | | 0.52 | 0.52 |
| EVB | Baseline | −75.0 | −44.7 | 7.08 | 13.68 |
| | 1 Isolator Added | −66.5 | −50.9 | 0.93 | 2.2 |
| | 2 Isolator Cascaded | −68.2 | −49.2 | 0.58 | 0.77 |
| | 2 Isolator Cascaded + 6 dB Attenuator | −60.6 | −53.7 | | |
| | 2 Isolator Cascaded + 10 dB Attenuator | −62.0 | −55.0 | | |
| | CPL --> 13 dB Attenuator --> 14 dB LNA | −67.7 | −54.6 | | |
| | CPL --> 20 dB Attenuator --> 14 dB LNA | −67.0 | −49.7 | | |
| 2 | Baseline | −69.9 | −44.0 | | |
| EVB | 1 Isolator Added | −70.6 | −44.4 | | |
| | 2 Isolator Cascaded | | | | |
| | 2 Isolator Cascaded + 6 dB Attenuator | −63.3 | −48.1 | | |

Configuration "Baseline" (1 EVB): The RFFE system including the RF system 140 without isolation in the coupler circuit 48 configured to isolate a switching transient impedance and/or a charge spur from the RF path 47; the coupler circuit 48 is coupled to the first RFFE module 150.

Configuration "1 Isolator added" (1 EVB): The coupler circuit 48 comprises an isolator; the coupler circuit 48 is coupled to the first RFFE module 150 as shown in FIG. 7I.

Configuration "2 Isolator cascaded" (1 EVB): The coupler circuit 48 comprises a cascaded isolator; the coupler circuit 48 is coupled to the first RFFE module 150.

Configuration "2 Isolator cascaded+6 dB attenuator" (1 EVB): The coupler circuit 48 comprises a cascaded isolator and a 6 dB attenuator; the coupler circuit 48 is coupled to the first RFFE module 150.

Configuration "2 Isolator cascaded+10 dB attenuator" (1 EVB): The coupler circuit 48 comprises a cascaded isolator and a 10 dB attenuator; the coupler circuit 48 is coupled to the first RFFE module 150.

Configuration "CPL→13 dB attenuator+14 dB LNA" (1 EVB): The coupler circuit 48 comprises a 13 dB attenuator and a 14 dB LNA; the coupler circuit 48 is coupled to the first RFFE module 150.

Configuration "CPL→20 dB attenuator+14 dB LNA" (1 EVB): The coupler circuit 48 comprises a 20 dB attenuator and a 14 dB LNA, wherein the coupler circuit 48 is coupled to the first RFFE module 150.

Configuration "Baseline" (2 EVB): The RFFE system 150 including the RF system 140 without isolation in the coupler circuit 48 configured to isolate a switching transient impedance and/or a charge spur from the RF path 47; the coupler circuit 48 is coupled to a second RFFE module (not shown in FIG. 7I).

Configuration "1 Isolator added" (2 EVB): The coupler circuit 48 comprises an isolator; the coupler circuit 48 is coupled to a second RFFE module (not shown in FIG. 7I).

Configuration "2 Isolator cascaded" (2 EVB): The coupler circuit 48 comprises a cascaded isolator; the coupler circuit 48 is coupled to a second RFFE module (not shown in FIG. 7I).

Configuration "2 Isolator cascaded+6 dB attenuator" (2 EVB): The coupler circuit 48 comprises a cascaded isolator and a 6 dB attenuator; the coupler circuit 48 is coupled to a second RFFE module (not shown in FIG. 7I).

As can be seen from TAB 1, less than 1 dB de-sense with approximately 0.5 μs coupler switching transition may be achieved by adding a passive isolator. A same level of LNA output spur can be achieved by active and a passive isolation. About 20 dB reverse isolation is needed to achieve 0.93 dB de-sense. About 40 to 50 dB reverse isolation is needed to achieve 0.58 dB de-sense. There is a secondary hot switching spur path which needs to be addressed if a lower de-sense level is needed.

Figure 8:
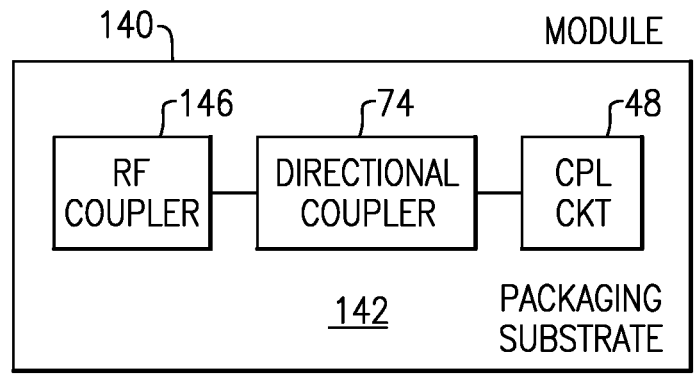
FIG. 8 is a block diagram of a packaged module that includes a coupler circuit according to an embodiment of the present disclosure.

FIG. 8 is a block diagram of a packaged module 140 that includes a coupler circuit according to an example, for instance a coupler circuit according to any one of FIG. 7A to 7I. The illustrated packaged module 140 includes a packaging substrate 142, an RF circuit 146, an RF coupler 74, and a coupler circuit 48. The packaging substrate 142 can be a laminate substrate, for example. The RF circuit 146, the RF coupler 74, and the coupler circuit 48 can be disposed on the packaging substrate 142. The RF circuit 146 can be any suitable circuit configured to provide an RF signal, such as a circuit that includes a power amplifier. The coupler circuit 48 of the module 140 can be arranged in a daisy chain with one or more other coupler circuits in accordance with any of the principles and advantages discussed herein.

Figure 9:
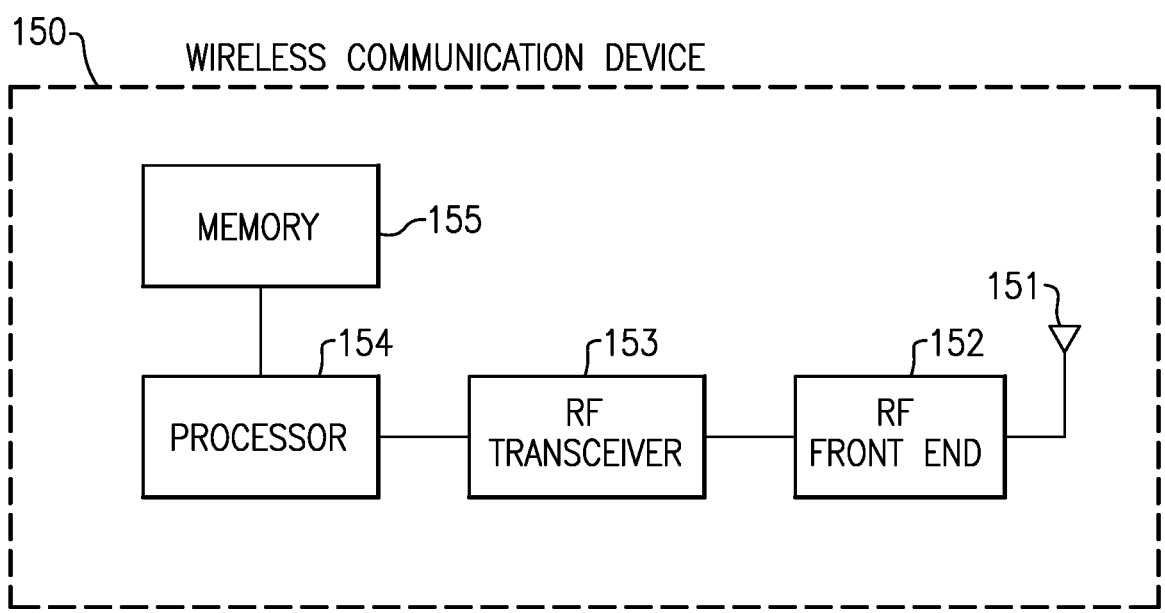
FIG. 9 is a block diagram of a wireless communication device that includes a coupler circuit according to an embodiment of the present disclosure.

FIG. 9 is a block diagram of a wireless communication device 150 that includes coupler circuits arranged in a daisy chain according to an example. The coupler circuits may be any one or more of the coupler circuits according to any one of FIG. 7A to 7I. The wireless communication device 150 can be any suitable wireless communication device. For instance, a wireless communication device 150 can be a mobile phone, such as a smart phone. As illustrated, the wireless communication device 150 includes an antenna 151, an RF front end 152, a transceiver 153, a processor 154, and a memory 155. The antenna 151 can transmit RF signals provided by the RF front end 152. The antenna 151 can transmit carrier aggregated signals provided by the RF front end 152. The antenna 151 can provide received RF signals to the RF front end 152 for processing.

The RF front end 152 can include one or more power amplifiers, one or more low noise amplifiers, RF switches, receive filters, transmit filters, duplex filters, or any combination thereof. The RF front end 152 can transmit and receive RF signals associated with any suitable communication standards. For instance, the RF front end 152 can provide a carrier aggregated signal to the antenna 151. RF signal paths discussed herein can be implemented in the RF front end 152. The RF front end 152 can include coupler circuits arranged in a daisy chain.

The RF transceiver 153 can provide RF signals to the RF front end 152 for amplification and/or other processing. The RF transceiver 153 can also process an RF signal provided by a low noise amplifier of the RF front end 152. The RF transceiver 153 can include one or more power detectors arranged to receive an output of a daisy chain of coupler circuits. The RF transceiver 153 can include one or more power detectors arranged to receive an output of a daisy chain of coupler circuits. The RF transceiver 153 can provide one or more signals to a transmit path to adjust power of a carrier based on an output of a power detector arranged to receive an output of a daisy chain of coupler circuits.

The RF transceiver 153 is in communication with the processor 154. The processor 154 can be a baseband processor. The processor 154 can provide any suitable base band processing functions for the wireless communication device 150. The memory 155 can be accessed by the processor 154. The memory 155 can store any suitable data for the wireless communication device 150.

Any of the principles and advantages discussed herein can be applied to other systems, not just to the systems described above. The elements and operations of the various examples described above can be combined to provide further examples. Some of the examples described above have provided examples in connection with power amplifiers and/or wireless communications devices. However, the principles and advantages of the examples can be used in connection with any other systems, apparatus, or methods that benefit could from any of the teachings herein. For instance, any of the principles and advantages discussed herein can be implemented in connection with detecting power from one of a plurality of different signal paths of which only one is active at a time. Any of the principles and advantages discussed herein can be implemented in association with RF circuits configured to process signals in a range from about 30 Kilohertz (kHz) to 300 Gigahertz (GHz), such as in a range from about 450 MHz to 6 GHZ.

Aspects of this disclosure can be implemented in various electronic devices. Examples of the electronic devices can include, but are not limited to, consumer electronic products, parts of the consumer electronic products such as packaged radio frequency modules, radio frequency filter die, uplink wireless communication devices, wireless communication infrastructure, electronic test equipment, etc. Examples of the electronic devices can include, but are not limited to, a mobile phone such as a smart phone, a wearable computing device such as a smart watch or an car piece or smart eyeglasses or virtual reality equipment, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, IoT radios, a camera such as a digital camera, a portable memory chip, a home appliance such as a washer or a dryer, a peripheral device, a wrist watch, a clock, etc. Further, the electronic devices can include unfinished products.

Unless the context indicates otherwise, throughout the description and the claims, the words "comprise." "comprising." "include." "including" and the like are to generally be construed in an inclusive sense, as opposed to an exclusive or exhaustive sense; that is to say, in the sense of "including, but not limited to." Conditional language used herein, such as, among others, "can," "could," "might." "may." "e.g.," "for example," "such as" and the like, unless specifically stated otherwise, or otherwise understood within the context as used, is generally intended to convey that certain examples include, while other examples do not include, certain features, elements and/or states. The word "coupled", as generally used herein, refers to two or more elements that may be either directly coupled, or coupled by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain examples have been described, these examples have been presented by way of example only, and are not intended to limit the scope of the disclosure. Indeed, the novel resonators, filters, multiplexer, devices, modules, wireless communication devices, apparatus, methods, and systems described herein may be embodied in a variety of other forms. Furthermore, various omissions, substitutions and changes in the form of the resonators, filters, multiplexer, devices, modules, wireless communication devices, apparatus, methods, and systems described herein may be made without departing from the spirit of the disclosure. For example, while blocks are presented in a given arrangement, alternative examples may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various examples described above can be combined to provide further examples. The accompanying claims and their equivalents are intended to cover such forms or modifications as would fall within the scope and spirit of the disclosure.

What is claimed is:

1. A radio frequency front end system comprising:
an RF path configured to propagate an RF signal between ports of the RF path;
an RF coupler configured to extract a portion of a power of the RF signal propagating between the ports of the RF path; and
a first RF coupler circuit coupled to the RF coupler and including a first isolator configured to isolate at least one of a switching transient impedance and a charge spur within a frequency range of the RF signal from the RF path.

2. The radio frequency front end system of claim 1 wherein the first isolator includes at least one of a first passive isolator and a first active isolator.

3. The radio frequency front end system of claim 2 wherein the first isolator is a first active isolator that includes a first attenuator.

4. The radio frequency front end system of claim 3 wherein the first active isolator further includes a first low noise amplifier LNA.

5. The radio frequency front end system of claim 1 wherein the RF path is coupled to a first RF module and the first RF coupler circuit is coupled to a second RF module.

6. The radio frequency front end system of claim 1 further comprising a first termination impedance.

7. The radio frequency front end system of claim 6 further comprising a first termination switch configured to couple the first termination impedance to a first termination port.

8. A radio frequency front end system comprising:
an RF path configured to propagate an RF signal between ports of the RF path;
an RF coupler configured to extract a portion of a power of the RF signal propagating between the ports of the RF path;
a first RF coupler circuit coupled to the RF coupler and including a first isolator configured to isolate at least one of a switching transient impedance and a charge spur from the RF path; and
a second RF coupler circuit coupled to the RF coupler and including a second isolator configured to isolate at least one of a switching transient impedance and a charge spur from the RF path.

9. The radio frequency front end system of claim 8 wherein the second isolator includes at least one of a second passive isolator and a second active isolator.

10. The radio frequency front end system of claim 8 wherein the second isolator is a second active isolator that includes a second attenuator and a second low noise amplifier LNA.

11. The radio frequency front end system of claim 8 wherein the RF path is coupled to a first RF module and the second RF coupler circuit is coupled to a second RF module.

12. The radio frequency front end system of claim 8 further comprising a second termination impedance and a second termination switch configured to couple the second termination impedance to a second termination port.

13. A radio frequency device comprising:
a transceiver; and
a radio frequency front end system coupled to the transceiver, the radio frequency front end system comprising an RF path configured to propagate an RF signal between ports of the RF path, an RF coupler configured to extract a portion of a power of the RF signal propagating between the ports of the RF path, and a first RF coupler circuit coupled to the RF coupler and including a first isolator configured to isolate at least one of a switching transient impedance and a charge spur within a frequency range of the RF signal from the RF path.

14. The radio frequency device of claim 13 wherein the first isolator includes at least one of a first passive isolator and a first active isolator.

15. The radio frequency device of claim 14 wherein the first isolator is a first active isolator that includes a first attenuator coupled to a first low noise amplifier LNA.

16. The radio frequency device of claim 13 wherein the RF path is coupled to a first RF module and the first RF coupler circuit is coupled to a second RF module.

17. The radio frequency device of claim 13 further comprising a first termination impedance and a first termination switch configured to couple the first termination impedance to a first termination port.

18. The radio frequency device of claim 13 further comprising a second RF coupler circuit coupled to the RF coupler and including a second isolator configured to isolate at least one of a switching transient impedance and a charge spur from the RF path, wherein the second isolator includes at least one of a second passive isolator and a second active isolator.

19. The radio frequency device of claim 18 wherein the second isolator is a second active isolator that includes a second attenuator coupled to a second low noise amplifier LNA.

20. The radio frequency device of claim 18 wherein the RF path is coupled to a first RF module and the second RF coupler circuit is coupled to a second RF module, the radio frequency device further comprising a second termination impedance and a second termination switch configured to couple the second termination impedance to a second termination port.

\* \* \* \* \*